(12) United States Patent
Kawaguchi et al.

(10) Patent No.: US 7,663,978 B2
(45) Date of Patent: Feb. 16, 2010

(54) DRIVE CONTROL APPARATUS, ELECTRONIC APPARATUS, METHOD OF CONTROLLING DRIVE OF ELECTRONIC APPARATUS, DRIVE CONTROL PROGRAM, AND RECORDING MEDIUM

(75) Inventors: Takashi Kawaguchi, Shiojiri (JP); Joji Kitahara, Shiojiri (JP); Makoto Okeya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 645 days.

(21) Appl. No.: 11/066,557

(22) Filed: Feb. 28, 2005

(65) Prior Publication Data

US 2005/0231184 A1    Oct. 20, 2005

(30) Foreign Application Priority Data

Feb. 26, 2004   (JP)   ............................. 2004-051182

(51) Int. Cl.
   G04C 22/00   (2006.01)
   G04F 5/00    (2006.01)
   G04C 3/00    (2006.01)
   H01L 41/00   (2006.01)

(52) U.S. Cl. .................... 368/66; 368/157; 368/204; 310/317

(58) Field of Classification Search ......... 368/155–157, 368/64, 66, 203–205; 318/696; 388/833, 388/837, 854; 323/281
See application file for complete search history.

(56) References Cited

U.S. PATENT DOCUMENTS

| | | | |
|---|---|---|---|
| 4,190,344 A | | 2/1980 | Ishiguro et al. |
| 4,214,827 A | | 7/1980 | Tominaga et al. |
| 4,219,999 A | * | 9/1980 | Ichikawa et al. .............. 368/66 |
| 4,730,287 A | * | 3/1988 | Yoshino et al. ............. 368/205 |
| 5,130,960 A | * | 7/1992 | Hayakawa ................... 368/204 |
| 6,061,304 A | * | 5/2000 | Nagata et al. ................. 368/66 |
| 6,163,100 A | * | 12/2000 | Morizaki et al. ............ 310/317 |
| 6,316,862 B1 | | 11/2001 | Nakata et al. |
| 6,466,519 B1 | * | 10/2002 | Nakamura et al. ............ 368/64 |
| 6,636,459 B1 | * | 10/2003 | Nagata ....................... 368/204 |
| 6,646,960 B1 | * | 11/2003 | Nagata ....................... 368/204 |

FOREIGN PATENT DOCUMENTS

| | | | | |
|---|---|---|---|---|
| DE | 2756712 A1 | 6/1978 | | |
| EP | 0232906 A2 | 8/1987 | | |
| EP | 0432971 A1 | 6/1991 | | |
| JP | 05341059 | * | 12/1993 | ................. 368/201 |
| JP | 06237582 A | 8/1994 | | |
| JP | 2004-4137 | 1/2004 | | |
| JP | 2004-150904 | 5/2004 | | |

* cited by examiner

*Primary Examiner*—Vit W Miska
(74) *Attorney, Agent, or Firm*—Global IP Counselors, LLP (57) ABSTRACT

In an electronic device 1 comprising a battery 200 and a piezoelectric actuator A, a power source voltage before drive control is started is maintained by a sample holding circuit 102, a reference voltage is set by a reference voltage generating circuit 103 on the basis of the power source voltage, and a control circuit 106 stops driving when the power source voltage falls below a drive stop voltage as compared by a second comparison circuit 105, and begins driving the piezoelectric actuator A again when the power source voltage exceeds the reference voltage as compared by a first comparison circuit 104. Therefore, the device can be more easily reduced in size by using a small power source, and the driving time can be markedly reduced using an intermittent driving procedure that corresponds to the conditions of the battery voltage.

14 Claims, 7 Drawing Sheets

DRIVE CONTROL APPARATUS, ELECTRONIC APPARATUS, METHOD OF CONTROLLING DRIVE OF ELECTRONIC APPARATUS, DRIVE CONTROL PROGRAM, AND RECORDING MEDIUM

BACKGROUND OF THE INVENTION

1. Field of the Invention

The present invention relates to a drive control apparatus, an electronic device, a drive control method for an electronic device, a drive control program for an electronic device, and a recording medium on which this program is recorded.

2. Description of Related Art

In conventional practice, in the field of portable electronic devices (for example, electronic timepieces, cameras, portable phones, and the like), it is common to appropriately select a combination of a power source and a load so that the voltage of the power source does not fall below the minimum power source voltage during the drive period. In this case, in order to allow for the device to be reduced in size and for the driving to be stable, it is preferable to select a power source with the smallest possible size and the least possible internal resistance, wherein the power source voltage is not likely to decrease, and it is also preferable to select a load with excellent drive efficiency.

Various piezoelectric actuators that utilize the piezoelectric effects of a piezoelectric element have been developed as loads with excellent drive efficiency, and have been utilized as drive devices. These piezoelectric elements have excellent responsiveness and conversion efficiency of electrical energy to mechanical energy, and therefore are suitable to be utilized in compact electronic devices.

Some of these such piezoelectric actuators have a vibrating body with a piezoelectric element as a primary structural element; for example, some are configured from a plate-shaped reinforcing plate having a protrusion at one end that comes into contact with the object to be driven, and also have piezoelectric elements provided on both sides of the reinforcing plate, and drive electrodes provided to the top surfaces of these piezoelectric elements. The piezoelectric elements apply a specific alternating-current voltage to the drive electrodes on the vibrating body, the vibrating body is excited by longitudinal vibration extending in the longitudinal direction thereof, and curved vibration that oscillates in a direction orthogonal to the longitudinal direction of the longitudinal vibration is induced, whereby the protrusion of the vibrating body rotates so as to describe an elliptical orbit. The piezoelectric actuator thereby achieves highly efficient driving with a small and thin configuration.

Drive methods have been proposed for when such a piezoelectric actuator as described above is used as a drive device (for example, see Literature; Japanese Laid-Open Patent Application No. 11-356068).

The aforementioned literature discloses intermittent driving wherein the drive signal applied to the piezoelectric actuator is in a burst wave pattern so as to repeat driving, stopping, and driving again. As a result of such intermittent driving, the drive voltage is recovered while driving has stopped, and therefore the piezoelectric actuator can be driven in a stable manner even if the drive voltage is somewhat reduced.

However, in the drive method in the aforementioned literature, the driving and stopping time must be set in advance for when the piezoelectric actuator is driven intermittently, and therefore the power source state, temperature, and other such conditions are assumed to be the worst and must be set with some leeway, leading to problems in which the entire intermittent driving time is extended. Specifically, this is because the drive time and the stopping time must be set so that the drive voltage does not fall below the minimum drive voltage during driving, and so that the drive voltage is recovered to a specific voltage when driving is started again after stopping. Also, if a power source with a large capacity is selected in order to prevent the drive time from extending, it will not necessarily be possible to reduce the size of the power source and the device, and for the same reasons, problems are encountered wherein limitations are imposed on the use of a power source with large internal resistance wherein the drive voltage can be easily reduced.

Such problems are not limited to situations wherein a piezoelectric actuator is used as a load, and also similarly occur when a motor or another such drive device is used.

SUMMARY OF THE INVENTION

A primary object of the present invention is to provide an electronic device, a drive control method thereof, a drive control program, and a recording medium in which the program is recorded, wherein size reduction of the device can be facilitated, a power source with large internal resistance can be used, and the drive time can be sufficiently reduced.

The drive control apparatus of the present invention controls the driving of a drive device driven by a drive voltage from a power source, wherein the drive control apparatus comprises a drive voltage maintaining device for maintaining the drive voltage at least before the drive control of the drive device is started, a reference voltage setting device for setting the reference voltage on the basis of the voltage maintained by the drive voltage maintaining device, a first comparison device for comparing the reference voltage and the drive voltage, a second comparison device for comparing a preset drive stop voltage and the drive voltage, and a control device for controlling the driving of the drive device on the basis of the comparison results of the first and second comparison devices; and wherein the control device controls driving so that the drive device is not driven when the drive voltage that has decreased during the driving of the drive device falls below the drive stop voltage in the comparison by the second comparison device, and the drive of the drive device is resumed when the drive voltage that has been recovered in the time during which the drive device was not driven exceeds the reference voltage in the comparison by the first comparison device, and intermittent driving is performed.

The drive voltage referred to herein may be a voltage equal to the power source voltage supplied directly from the power source, and may also be a voltage that has been increased or reduced by means of a booster circuit or a step-down circuit provided between the power source and the piezoelectric actuator. Also, the object to be driven by the drive voltage is not limited to the drive device, and the drive control apparatus itself may also be driven by the drive voltage.

According to the present invention, the drive device is not driven when the drive voltage that has decreased during driving of the drive device has fallen below the drive stop voltage, the drive voltage is recovered without decreasing further, and the drive of the drive device is resumed when the drive voltage that has been recovered while the drive device is not driven is made greater than the reference voltage, thus achieving intermittent driving. In this case, the drive stop voltage should be equal to or greater than the minimum drive voltage necessary to operate the drive device, a drive circuit, or the like, and the reference voltage should be set to an arbitrary voltage (for example, set to a maximum voltage of 90% or the like) that is equal to or less than the initial drive voltage (maximum voltage). It is clear that if the drive voltage does not fall below the drive stop voltage while the drive device is driven, then driving is continued without interruption.

With a procedure in which the drive device is not driven and the restarting of driving is controlled according to the decrease and recovery conditions of the drive voltage as described above, driving according to the reduction in drive voltage can be achieved even when a small power source liable to decreases in voltage is used, and the size of the power source can be sufficiently reduced. Furthermore, it is possible to make it easier to use a particular power source with large internal resistance, in which voltage is likely to decrease.

Also, the time at which intermittent driving is started and stopped is not fixed as with conventional driving methods, but driving is automatically stopped and restarted according to the drive voltage, or, in other words, driving continues until the drive voltage falls below the drive stop voltage, and driving is restarted if the drive voltage exceeds the reference voltage. Therefore, the driving time is maximized, the time in which driving is stopped is reduced to the necessary minimum, and the entire drive time involved in intermittent driving can be reduced.

Furthermore, setting the reference voltage on the basis of the drive voltage maintained before drive control is started makes it possible to set the reference voltage on the basis of the reduced drive voltage even when the initial value of the drive voltage has decreased after a certain amount of continuous use. Therefore, the drive time can be further reduced in comparison with the prior art, in which the drive and non-drive time of intermittent driving must be set by taking into account that the initial value of such a drive voltage will decrease as well.

In this case, it is preferable that the drive control apparatus of the present invention comprises a drive amount determination device for determining the drive amount of the drive device and sending the determined drive amount to the control device, and that the control device completes the intermittent driving of the drive device at a point in time when the drive amount has reached a specific drive amount.

With such a configuration, it is possible to stop the drive device and complete the intermittent driving, and to drive the drive device solely in the desired amount by determining the drive amount of the drive device with the drive amount determination device, even if the drive time and non-drive time of the intermittent driving are set in advance. Also, since the drive completion instruction for the drive device is executed by the control device for controlling the intermittent driving previously described, there is no need to provide a circuit or the like for controlling the completion of separate driving, and the drive control circuits and other components of the apparatus can be simplified.

Also, in the drive control apparatus of the present invention, it is preferable that drive control is stopped at a specific timing during the intermittent driving of the drive device, that the drive voltage is reestablished by the drive voltage maintaining device while intermittent driving is stopped, and that the reference voltage is reset by the reference voltage setting device on the basis of the drive voltage reestablished.

With such a configuration, the reference voltage is set according to the recovery conditions, even when the recovery conditions of the drive voltage are nonuniform, by maintaining the drive voltage one more time at each specific preset timing (specific preset time intervals), making it possible to reduce the time when no driving is performed and to reduce the overall driving time even when the drive voltage becomes gradually harder to recover during intermittent driving.

Furthermore, in the drive control apparatus of the present invention, it is preferable that the drive device is a piezoelectric actuator comprising a vibrating body vibrated by the application of a drive signal with a specific frequency to a piezoelectric element.

With such a configuration, as previously described, the configuration is already compact, but the apparatus and power source can be reduced in size even further by using the piezoelectric actuator capable of highly efficient driving as the drive device.

The electronic device of the present invention comprises a power source, a drive device driven by a drive voltage from the power source, and a drive control apparatus for controlling the driving of the drive device, wherein the drive control apparatus has a drive voltage maintaining device for maintaining the drive voltage at least before the drive control of the drive device is started, a reference voltage setting device for setting the reference voltage on the basis of the voltage maintained by the drive voltage maintaining device, a first comparison device for comparing the reference voltage and the drive voltage, a second comparison means for comparing a preset drive stop voltage and the drive voltage, and a control device for controlling the driving of the drive device on the basis of the comparison results of the first and second comparison devices, and wherein the control device controls driving so that the drive device is not driven when the drive voltage that has decreased during the driving of the drive device falls below the drive stop voltage in the comparison by the second comparison device, and the drive of the drive device is resumed when the drive voltage that has been recovered in the time during which the drive device was not driven exceeds the reference voltage in the comparison by the first comparison device, and intermittent driving is performed.

According to the present invention, driving of the drive device in accordance with the decreasing conditions and recovery conditions of the drive voltage can be achieved similar to the drive control apparatus of the present invention previously described; therefore, the overall driving time can be reduced, the power source and the device can be made much smaller, and a power source with large internal resistance can be made easier to use.

In the electronic device of the present invention, it is preferable that the power source is a primary or secondary battery.

With such a configuration, it is possible to configure a portable device with the above-described actions by using a primary or secondary battery as the power source for operating the drive device. In this case, a lithium ion battery or another battery with large internal resistance as described above can also be employed as the primary or secondary battery.

Also, in the electronic device of the present invention, it is preferable that a capacitor is connected in series with the power source.

With such a configuration, accumulating an electric charge in the capacitor connected to the power source makes it possible to prevent a reduction in the power source voltage (drive voltage) resulting from driving the drive device, and also makes it possible to reduce the size of the power source and to stabilize driving.

Furthermore, the electronic device of the present invention is preferably an electronic timepiece comprising a date display mechanism driven by the drive device.

With such a configuration, effects similar to those previously described can be exhibited while the date display mechanism of the electronic timepiece is driven, and it is easier to reduce the size and thickness of the electronic timepiece. The date display mechanism driven by the drive device is not continuously driven at all times but may driven for a limited time in a day with a specific drive amount (rotating amount). Therefore, drive control based on the intermittent driving of the present invention can be used.

In the electronic device of the present invention, it is preferable that a holding signal is sent from the control device to the drive voltage maintaining device on the basis of the basic timepiece drive signal of the electronic timepiece, and the drive voltage is maintained by the drive voltage maintaining device.

With such a configuration, the drive voltage is maintained with a timing based on the basic timepiece drive signal of the electronic timepiece, and the driving of the drive device is started. Therefore, the date display mechanism can be driven to an arbitrary time (for example, near 12:00 am) and the date display can be changed.

Also, in the electronic timepiece of the present invention, it is preferable that the drive control is stopped with a timing based on the basic timepiece drive signal of the electronic timepiece during the intermittent driving of the drive device, the drive voltage is reestablished by the drive voltage maintaining device while the intermittent driving is stopped, and the reference voltage is reset by the reference voltage setting device on the basis of the drive voltage reestablished.

With such a configuration, the entire drive time can be reduced because the reference voltage is set according to the recovery conditions of the drive voltage, similar to the previous description. Since the drive voltage is reestablished based on the basic timepiece drive signal of the electronic timepiece, it is possible to select a setting at which the drive voltage is reestablished in one-second intervals or other short intervals, for example, and it is possible to perform driving that corresponds to changes in the state of the power source in a sequential manner.

The present invention provides a drive control method for a electronic device for controlling the driving of an electronic device provided with a power source and a drive device driven by a drive voltage from the power source, wherein the drive control method for an electronic device has a drive voltage maintaining step for maintaining the drive voltage at least before the drive control of the drive device is started, a reference voltage setting step for setting the reference voltage on the basis of the voltage maintained in the drive voltage maintaining step, a first comparison step for comparing the reference voltage and the drive voltage, a second comparison step for comparing a preset drive stop voltage and the drive voltage, and an intermittent drive control step for controlling the driving so that the drive device is not driven when the drive voltage that has decreased during the driving of the drive device falls below the drive stop voltage in the second comparison step, and the drive of the drive device is resumed when the drive voltage that has been recovered in the time during which the drive device was not driven exceeds the reference voltage in the first comparison step, and intermittent driving is performed.

According to the present invention, driving of the drive device in accordance with the decreasing conditions and recovery conditions of the drive voltage can be achieved similar to the drive control apparatus of the present invention previously described; therefore, the overall driving time can be reduced, the power source and the device can be made much smaller, and a power source with large internal resistance can be made easier to use.

The present invention also provides a drive control program for an electronic device having a power source, a drive device driven by a drive voltage from the power source, and a drive control apparatus for controlling the driving of the drive device, wherein the computer incorporated into the electronic device is made to function at least as an intermittent control device selected from among a drive voltage maintaining device for maintaining the drive voltage at least before the drive control of the drive device is started, a reference voltage setting device for setting the reference voltage on the basis of the voltage maintained by the drive voltage maintaining device, a first comparison device for comparing the reference voltage and the drive voltage, a second comparison device for comparing the drive voltage and a preset drive stop voltage, and an intermittent drive control device for controlling the driving so that the drive device is not driven when the drive voltage that has decreased during the driving of the drive device falls below the drive stop voltage in the second comparison device, and the drive of the drive device is resumed when the drive voltage that has been recovered in the time during which the drive device was not driven exceeds the reference voltage in the first comparison device, and intermittent driving is performed.

According to the present invention, a computer is made to function at least as the control device (intermittent drive control device), whereby the overall driving time can be reduced, the power source and apparatus (device) can be made much smaller, and a power source with large internal resistance can be made easier to use, similar to the previous descriptions. If the control device is configured from a computer, conditions can be easily changed merely by changing the program, and the appropriate control can therefore be easily performed according to various apparatuses (devices).

Also, in the recording medium for the drive control program according to the present invention, the aforementioned drive control program of the electronic device may be recorded so as to be capable of being read by a computer.

With such a configuration, the drive control program can be easily read by a computer incorporated into the device even when the program has been altered or improved, and the program can be updated.

According to the present invention as described above, it is possible to provide a drive control apparatus, an electronic device, a drive control method, a drive control program, and a recording medium, wherein the apparatus or device can be made smaller, a power source with large internal resistance can be used, and the drive time can be markedly reduced.

DETAILED DESCRIPTION OF PREFERRED EMBODIMENT(S)

1. First Embodiment

The first embodiment of the present invention will now be described with reference to the diagrams.

[1-1. Entire Configuration]

Figure 1:
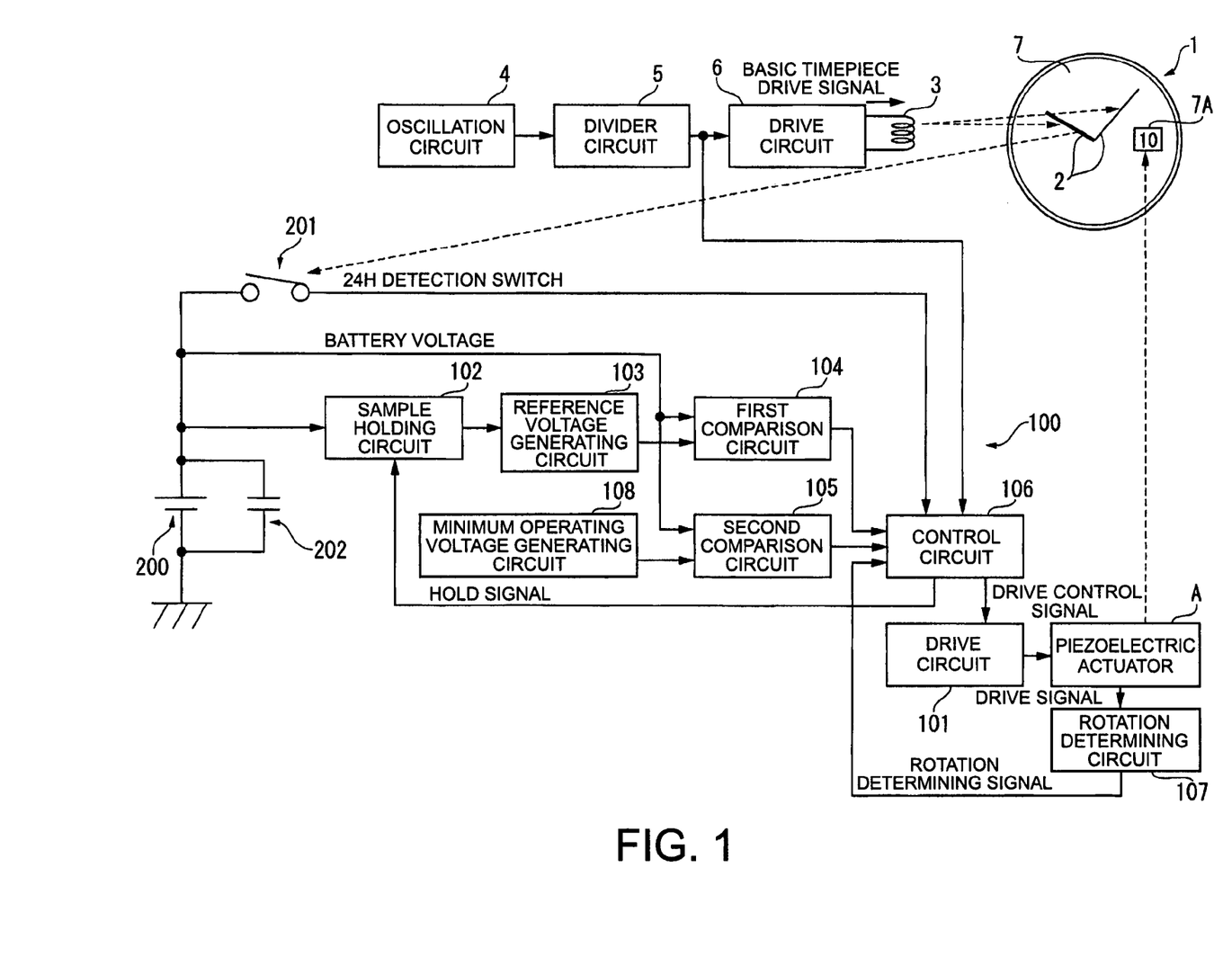
FIG. 1 is a block diagram showing the configuration of an electronic timepiece according to the first embodiment of the present invention, and the configuration of the drive control apparatus of the date display mechanism thereof.
Figure 2:
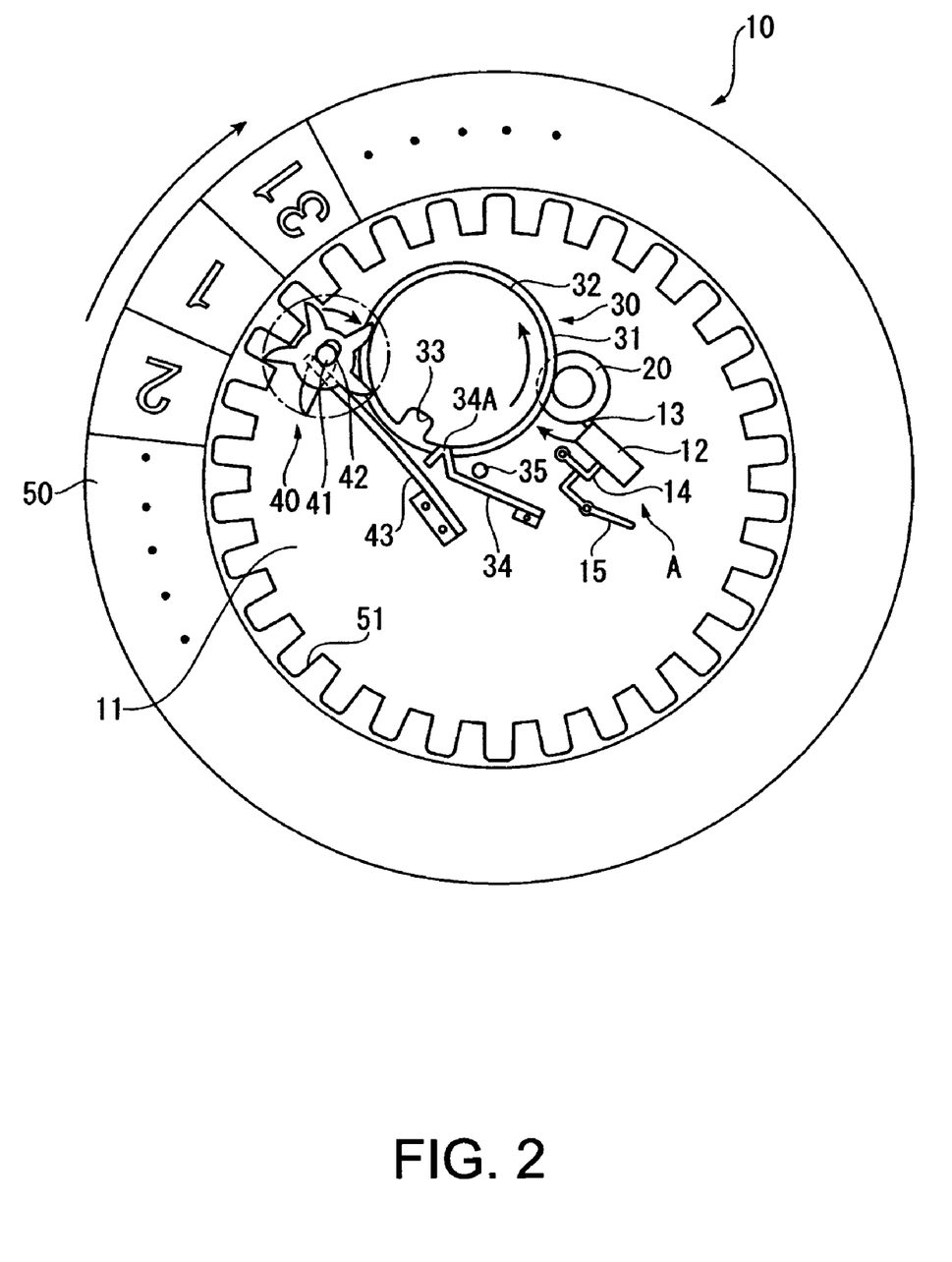
FIG. 2 is a plan view showing the detailed configuration of the date display mechanism.

FIG. 1 is a block diagram showing the configuration of the drive apparatus for an electronic timepiece 1 and a date display mechanism 10 thereof in the present embodiment. FIG. 2 is a plan view showing the detailed configuration of the date display mechanism 10.

As shown in FIG. 1, the electronic timepiece 1 is a wristwatch that has pointers 2 for displaying the time, and a stepping motor 3 for driving the pointers 2. The driving of the stepping motor 3 is controlled by an oscillation circuit 4, a divider circuit 5, and a drive circuit 6. The oscillation circuit 4 has a standard oscillation source composed of a crystal oscillator, and outputs a standard pulse. The divider circuit 5 inputs the standard pulse outputted from the oscillation circuit 4, and produces a standard signal (a signal of 1 Hz, for example) on the basis of the standard pulse. The drive circuit 6 generates a motor drive pulse for driving the stepping motor 3 on the basis of the standard signal outputted from the divider circuit 5.

As shown in FIG. 2, the primary components of the date display mechanism 10 usually consist of a piezoelectric actuator A, a rotor 20 as the object to be rotatably driven by the piezoelectric actuator A, a deceleration gear train that decelerates and transmits the rotation of the rotor 20, and a date wheel 50 rotated by the drive force transmitted via the deceleration gear train. The deceleration gear train comprises a date turning intermediate wheel 30 and a date turning wheel 40. The piezoelectric actuator A, the rotor 20, the date turning intermediate wheel 30, and the date turning wheel 40 are supported on a bottom plate 11. The piezoelectric actuator A has a flat, thin rectangular vibrating body 12, and this vibrating body 12 is disposed so that the distal end thereof comes into contact with the outer peripheral surface of the rotor 20. A disc-shaped dial 7 is provided at the top of the date display mechanism 10 as shown in FIG. 1, and part of the outer peripheral surface of the dial 7 is provided with a window 7A for displaying the date, and is designed so that the date on the date wheel 50 is visible through the window 7A. Also, a movement or the like connected to the stepping motor 3 for driving the pointers 2 is provided at the bottom (rear side) of the bottom plate 11.

The date turning intermediate wheel 30 is configured from a large wheel 31 and a small wheel 32. The small wheel 32 has a cylindrical shape somewhat smaller than the large wheel 31, and a notch 33 with a substantial square shape is formed in the outer peripheral surface thereof. The small wheel 32 is fixed in place so as to have the same center as the large wheel 31. A gear 21 at the top of the rotor 20 meshes with the large wheel 31. Therefore, the date turning intermediate wheel 30 composed of the large wheel 31 and small wheel 32 rotates in conjunction with the rotation of the rotor 20.

A plate spring 34 is provided to the bottom plate 11 on the side of the date turning intermediate wheel 30, the proximal end of the plate spring 34 is fixed in place on the bottom plate 11, and the distal end 34A is bent into a rough V shape. The distal end 34A of the plate spring 34 is provided to be capable of going into and out of the notch 33 of the date turning intermediate wheel 30. A contact element 35 is disposed at a position near the plate spring 34, and this contact element 35 is designed to come into contact with the plate spring 34 when the date turning intermediate wheel 30 rotates and the distal end 34A of the plate spring 34 goes into the notch 33. A specific voltage is applied to the plate spring 34, and when the plate spring 34 comes into contact with the contact element 35, this voltage is applied to the contact element 35 as well. Therefore, the state in which the date wheel is turned can be determined by determining the voltage of the contact element 35.

The date wheel 50 has a ring shape, and an inner gear 51 is formed on the inner peripheral surface thereof. The date turning wheel 40 has a gear with five teeth, and meshes with the inner gear 51 of the date wheel 50. Also, a shaft 41 is provided in the center of the date turning wheel 40, and this shaft 41 is inserted into a through-hole 42 formed in the bottom plate 11. The through-hole 42 is formed extending along the peripheral direction of the date wheel 50. The date turning wheel 40 and the shaft 41 are urged upward and to the right in FIG. 2 by a plate spring 43 fixed on the bottom plate 11. The date wheel 50 is also prevented from oscillating by the urging action of the plate spring 43.

The vibrating body 12 of the piezoelectric actuator A is a rectangular shaped plate enclosed by two long sides and two short sides. Also, the vibrating body 12 has a stacked structure in which a reinforcing plate made of stainless steel or the like is sandwiched between two rectangular plate-shaped piezoelectric elements. The plate has roughly the same shape as the piezoelectric elements, and is thinner than the piezoelectric elements. For the piezoelectric elements, lead zirconate titanate (PZT™), crystal, lithium niobate, barium titanate, lead titanate, lead metaniobate, polyvinylidene fluoride, zinc lead niobate, scandium lead niobate, and the like can be used.

The vibrating body 12 has a contact unit 13 near the middle of one short side in the width direction. This contact unit 13 is obtained by cutting the reinforcing plate or another such method, and has a distal end with a gradually curving surface that protrudes from the piezoelectric elements. The vibrating body 12 maintains an orientation in which the distal end of the contact unit 13 is brought into contact with the outer peripheral surface of the rotor 20. A supporting member 14 and an urging member 15 are provided to the piezoelectric actuator A in order to keep the vibrating body 12 in such a position.

The supporting member 14 of the piezoelectric actuator A is formed integrally with the reinforcing plate by cutting the reinforcing plate or other such methods. This supporting member 14 is an L-shaped member composed of a vertical part protruding vertically from the center of one long side of the vibrating body 12 and a horizontal part extending from the distal end of the vertical part towards the side of the rotor 20 parallel to the long sides. A pin protruding from the bottom plate 11 is inserted through the end of the horizontal part on the opposite side of the vertical part, and the supporting member 14 and the vibrating body 12 fixed thereon are capable of rotating around this pin as a rotational axis. One end of the urging member 15 is engaged near the center of the horizontal part of the supporting member 14. A pin protruding from the bottom plate 11 is inserted through the middle section of the urging member 15, which is capable of rotating around the pin as a rotational axis. Also, the end of the urging member 15 on the opposite side of the supporting member 14 engages with the bottom plate 11, and the pressure with which the contact unit 13 of the vibrating body 12 is pressed onto the outer peripheral surface of the rotor 20 can be adjusted by varying the position of this end.

In the configuration described above, the vibrating body 12 of the piezoelectric actuator A produces longitudinal oscillation, which a first oscillation mode, as well as curved oscillation, which is a second oscillation mode induced by the longitudinal oscillation, as a result of a drive signal with a specific frequency being applied to the piezoelectric elements from a drive circuit to be described later, and the contact unit 13 moves while describing an elliptical arc within a plane containing the plate surface. The rotor 20 is struck on the outer peripheral surface by the contact unit 13 of the vibrating body 12, and is rotatably driven around the timepiece as shown by the arrow in FIG. 2. The rotation of the rotor 20 is transmitted to the date turning wheel 40 via the date turning intermediate wheel 30, and the date turning wheel 40 causes the date wheel 50 to rotate around the timepiece. The transmissions of force from the vibrating body 12 to the rotor 20, from the rotor 20 to the deceleration gear train (the date turning intermediate wheel 30 and the date turning wheel 40), and from the deceleration gear train to the date wheel 50 all constitute a transmission of force in a direction parallel to the surface of the bottom plate 11 of the vibrating body 12. Therefore, coils or rotors are not stacked in the thickness direction as with a stepping motor, but the vibrating body 12 and the rotor 20 are disposed in the same plane, making it possible to reduce the thickness of the date display mechanism 10. Since the date display mechanism 10 can be made thinner, the entire electronic timepiece 1 can also be made thinner as well.

[1-2. Configuration of the Drive Control Apparatus of the Piezoelectric Actuator A]

As shown in FIG. 1, the drive control apparatus 100 for controlling the driving of the piezoelectric actuator A has a drive circuit 101 for sending a drive signal to the piezoelectric actuator A, a sample holding circuit 102 as a power source voltage maintaining device, a reference voltage generating circuit 103 as a reference voltage setting device, a first comparison circuit 104 as a first comparison device, a second comparison circuit 105 as a second comparison device, a control circuit 106 as a control device, and a rotation determining circuit 107 as a drive amount determining device. A battery 200, which is a power source, is connected to the sample holding circuit 102 and the first and second comparison circuits 104 and 105, and is also connected to the control circuit 106 via a switch 201. The switch 201 determines the time of the electronic timepiece 1, opens and closes accordingly, is turned on by a 24-hour signal from the electronic timepiece 1, and sends a drive control start signal to the control circuit 106. The 24-hour signal may be produced by determining when the positions of the pointers (hour hand) 2 reaches the 24-hour position, or may also be produced by determining when a value counted by a counter circuit or the like provided after the divider circuit 5 reaches 24 hours. A gear that rotates once every 24 hours or a mechanism for determining that the hour hand has passed the 12-hour position twice can be employed as a means for determining the positions of the pointers 2.

A capacitor 202 is connected in series with the battery 200, and an electric charge is accumulated on the capacitor 202 when the drive control apparatus 100 is not being operated. A secondary battery may be used as the power source, and a lithium ion battery or another such primary or secondary battery with large internal resistance may be used.

The sample holding circuit 102 is configured from an operational amplifier or a capacitor for maintaining voltage, and is designed to hold (maintain) the battery voltage V0 of the battery 200 on the basis of a hold signal from the control circuit 106. The reference voltage generating circuit 103 divides the battery voltage V0 outputted from the sample holding circuit 102 with a resistance, and outputs a reference voltage V1. At this time, the reference voltage V1 is set to a specific ratio in relation to the battery voltage V0 (for example, 90%). In other words, the reference voltage generating circuit 103 sets the reference voltage V1 on the basis of the battery voltage V0 maintained by the sample holding circuit 102. The ratio of the reference voltage V1 to the battery voltage V0 is not limited to 90%, but can be arbitrarily set within a range of 80% to 95%, for example, according to the characteristics of the battery 200 or the piezoelectric actuator A.

The first and second comparison circuits 104 and 105 are both configured from comparators, and the first comparison circuit 104 compares the voltage values of the reference voltage V1 outputted from the reference voltage generating circuit 103 and the battery voltage V, and sends the comparison results to the control circuit 106.

A minimum operating voltage generating circuit 108 is connected to the second comparison circuit 105, and the second comparison circuit 105 compares the voltage values of the minimum operating voltage V2, which is the drive stop voltage outputted from the minimum operating voltage generating circuit 108, and the battery voltage V, and sends the comparison result to the control circuit 106. At this time, the minimum operating voltage V2 is set to a value above the minimum voltage required in order to drive the piezoelectric actuator A and the circuits.

The minimum operating voltage V2 of the piezoelectric actuator A is 1.0 V (the voltage of the battery 200 is about 1.5 V), and is greater than the drive voltages of the oscillation circuit 4 of the electronic timepiece 1 (minimum operation voltage: about 0.7 V), the divider circuit 5, the drive circuit 6, the control circuit 106 of the piezoelectric actuator A, the drive circuit 101, and the like. Specifically, this is because the drive signal for the piezoelectric actuator A is produced by the oscillation circuit 4 or the divider circuit 5, and therefore when the minimum operating voltage V2 of the piezoelectric actuator A is not set to be higher than the minimum operating voltage of the oscillation circuit 4 or the divider circuit 5, the piezoelectric actuator A can no longer be driven.

The control circuit 106 operates with the drive control start signal from the switch 201 as a trigger, and sends a hold signal to the sample holding circuit 102 on the basis of a basic timepiece drive signal from the divider circuit 5. Furthermore, the control circuit 106 sends a drive control signal to the drive circuit 101 on the basis of the comparison results from the first and second comparison circuits 104 and 105, and controls the driving and resting of the piezoelectric actuator A. Also, a rotation determination signal from the rotation determining circuit 107 is inputted to the control circuit 106, the control circuit 106 sends a stopping signal to the drive circuit 101 on the basis of this signal, and conditions are created in which the piezoelectric actuator A is not driven.

The drive circuit 101 is designed to drive the piezoelectric actuator A by applying a drive signal on the basis of the drive control signal from the control circuit 106, or to not drive the piezoelectric actuator A by ceasing to apply the drive signal.

The rotation determining circuit 107 determines the rotational frequency of the date turning intermediate wheel 30 from the number of times that the plate spring 34 and the contact element 35 of the date display mechanism 10 come into contact, and sends the determined rotational frequency as a rotation determination signal to the control circuit 106. It is thereby possible to determine the specific drive amount of the piezoelectric actuator A, or, in other words, the rotating amount for one day of the date wheel 50. Determining the rotating amount of the date wheel 50 is not limited to using the plate spring 34 and the contact element 35, and means can also be utilized that determine the rotating state of the rotor 20 or the date turning intermediate wheel 30 and output a specific pulse signal; specifically, a conventional photoreflector, a photointerrupter, an MR sensor, or other such various rotational encoders or the like can be utilized.

[1-3. Drive Control Method for the Piezoelectric Actuator A]

Figure 3:
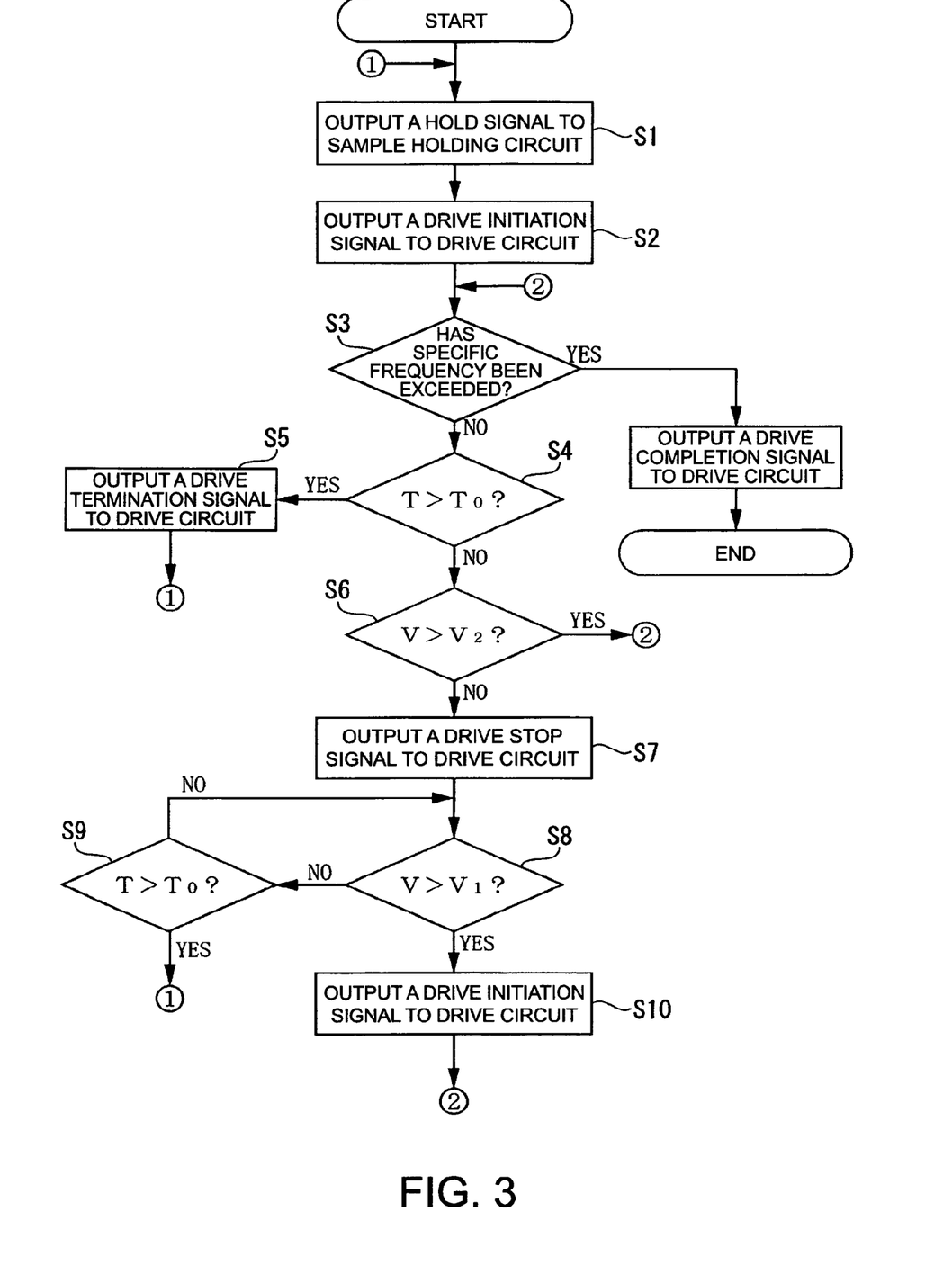
FIG. 3 is a flow chart for describing the drive control method of the date display mechanism.
Figure 4:
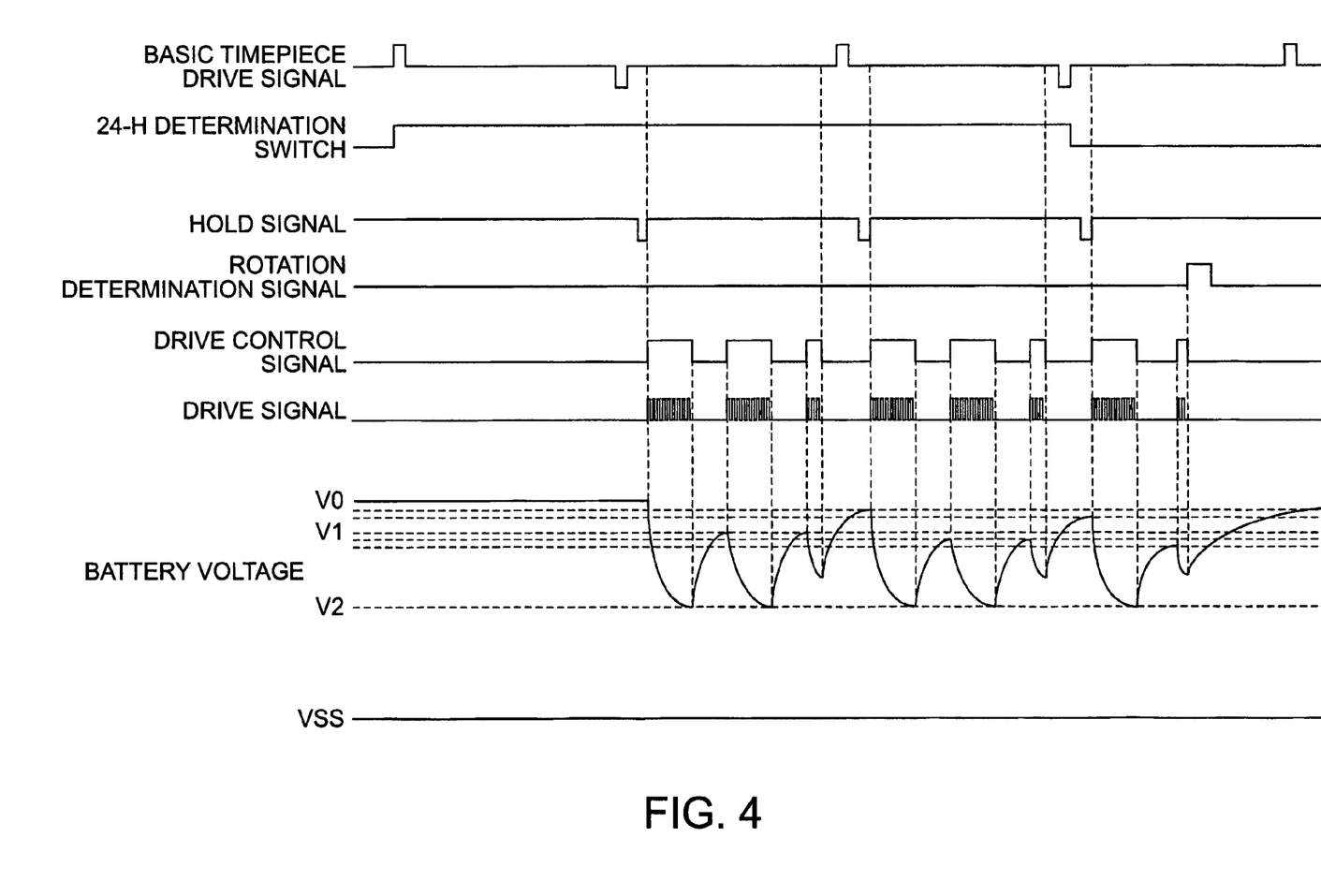
FIG. 4 is a timing chart showing the operation of the drive control apparatus.

FIG. 3 is a flow chart for describing the drive control method for the piezoelectric actuator A. FIG. 4 is a timing chart showing the operation of the drive control apparatus 100.

The method for driving the piezoelectric actuator A by the aforementioned drive control apparatus 100 will now be described with reference to FIGS. 3 and 4.

Having received the drive control start signal from the switch 201, the control circuit 106 outputs a hold signal to the sample holding circuit 102 on the basis of the basic timepiece drive signal from the divider circuit 5, and the battery voltage V0 is held by the sample holding circuit 102 (step S1, power source voltage holding step). At this time, a reference voltage V1 is generated by the reference voltage generating circuit 103 on the basis of the held battery voltage V0 (reference voltage setting step).

In the next step S2, the control circuit 106 outputs a drive control signal that instructs the drive circuit 101 to start driving, and the driving of the piezoelectric actuator A is started. The driving of the piezoelectric actuator A is completed when the rotational frequency of the date turning intermediate wheel 30 exceeds a specific rotational frequency in step S3, to be described later. Also, in the below-described step S4, driving is temporarily ceased when the elapsed riving time T exceeds a set time T0 (step S5), and the battery voltage V0 is held again is step S1.

When the determination result is "No" in steps S3 and S4, the battery voltage V and the minimum operating voltage V2 are compared by the second comparison circuit 105 in the second comparison step of step S6, and the piezoelectric actuator A continues to be driven while the battery voltage V exceeds the minimum operating voltage V2. In other words, in step S6, when the determination result is "Yes," the drive circuit 101 continues to apply a drive signal, and the piezoelectric actuator A continues to operate, while the rotational frequency of the date turning intermediate wheel 30 does not exceed a specific rotational frequency and the elapsed time T does not exceed the set time T0. As a result of the piezoelectric actuator A continuing to operate, the battery voltage V gradually decreases as shown in FIG. 4.

When the determination result is "No" in step S6, or, specifically, when the battery voltage V falls below the minimum operating voltage V2, the control circuit 106 outputs a drive stop signal that instructs the drive circuit 101 to stop driving, and the piezoelectric actuator A stops being driven (step S7). As a result of the piezoelectric actuator A no longer being driven, the battery voltage V is gradually recovered as shown in FIG. 4. The recovery of the battery voltage V is a natural occurrence, but another possibility is to connect a power generator to a storage battery 200, so that the battery voltage V of the storage battery 200 is recovered by the power generated by the power generator while the piezoelectric actuator A is not being driven.

In the first comparison step of the next step S8, the battery voltage V and the reference voltage V1 are compared by the first comparison circuit 104, and if the battery voltage V has fallen below the reference voltage V1, that is, if the determination result is "No" in step S3, the control circuit 106 maintains the state of not driving the piezoelectric actuator A and remains in standby until the battery voltage V is brought back up to the reference voltage V1. If the elapsed time T exceeds the set time T0 in step S9 at this time, the process once again returns to step S1 where the battery voltage V0 is held, and all the steps described above are repeated.

When the battery voltage V exceeds the reference voltage V1, or, in other words, when the determination result is "Yes" in step S8, the control circuit 106 outputs a drive restart signal that instructs the drive circuit 101 to restart driving, and the driving of the piezoelectric actuator A is restarted (step S10). After the driving of the piezoelectric actuator A is thus restarted, the process returns to step S3, and the piezoelectric actuator A is intermittently driven while the rotational frequency of the date turning intermediate wheel 30 does not exceed the specific rotational frequency and the elapsed time T does not exceed the set time T0 (intermittent drive control step).

Also, in step S4, after the basic timepiece drive signal from the divider circuit 5 is received, the elapsed time T and the set time T0 that has been set in advance are compared, and when the elapsed time T exceeds the set time T0 (when the determination result is "Yes"), the control circuit 106 outputs a drive stop signal to the drive circuit 101, and the intermittent driving of the piezoelectric actuator A is temporarily stopped (step S5). This set time T0 is set based on the time intervals of the basic timepiece drive signals, and is also set so as to ensure that the intermittent driving of the piezoelectric actuator A is stopped before the next basic timepiece drive signal is inputted to the control circuit 106. Specifically, in the present embodiment, the basic timepiece drive signal is 1 Hz, and therefore the set time T0 should be set to a time of 1 second or less (for example, 0.9 seconds). Thus, the basic timepiece drive signal inputted from the divider circuit 5 to the control circuit 106 is a plurality of signals composed of 1 Hz signals, and the drive pulse of the stepping motor 3 and the drive signal for driving the piezoelectric actuator A outputted from the drive circuit 101 of the piezoelectric actuator A are controlled so as to not chronologically overlap, as shown in FIG. 4. Therefore, as a result of the piezoelectric actuator A not being driven about every one second, the movement of the pointers 2 of the electronic timepiece 1 and the driving of the piezoelectric actuator A are not executed simultaneously, and the load on the storage battery 200 is reduced to enable both the pointers 2 and the piezoelectric actuator A to be driven in a stable manner.

In the subsequent step S5, the control circuit 106 waits for the input of the next basic timepiece drive signal while in a state wherein the piezoelectric actuator A is not driven in step S1, as shown in FIG. 3, a hold signal is outputted one more time to the sample holding circuit 102 when the basic timepiece drive signal is inputted, and the battery voltage V0 is again held by the sample holding circuit 102. At this time, as shown in FIG. 4, the battery voltage V0 is not brought back to the initial voltage but is instead kept at a voltage value somewhat lower than the initial voltage, and the reference voltage V1 is set to a value somewhat lower than the last time in the reference voltage generating circuit 103 on the basis of the battery voltage V0 thus held (reference voltage resetting step).

In step S3, the control circuit 106 determines whether the rotational frequency of the date turning intermediate wheel 30 exceeds a specific rotational frequency, in other words, whether the date wheel 50 has rotated by one day, on the basis of the rotation determination signal inputted form the rotation determining circuit 107. When the rotational frequency of the date wheel 50 is insufficient, or when the determination result is "No" in step S110, the piezoelectric actuator A continues to be driven, and when the date wheel 50 rotates by a specific amount and the determination result is "Yes" in step S3, a drive stop signal is outputted to the drive circuit 101 to stop the driving of the piezoelectric actuator A, and drive control is completed (drive completion step).

In the drive control described above, if the battery voltage V does not fall below the minimum operating voltage V2 and the elapsed time T does not exceed the set time T0 until the rotating amount of the date wheel 50 reaches the specific amount, then the piezoelectric actuator A is driven without stopping from the start of drive control until driving is completed.

[1-4. Effects of the First Embodiment]

The first embodiment described above has the following effects.

(1) Even if the battery voltage V decreases after the drive control of the piezoelectric actuator A is started, the control circuit 106 ensures that the piezoelectric actuator A is not driven when the battery voltage V and the minimum operating voltage V2 are compared by the second comparison circuit 105 and the battery voltage V falls below the minimum operating voltage V2, and the battery voltage V is therefore recovered without decreasing any further. When the battery voltage V and the reference voltage V1 are compared by the first comparison circuit 104 and the battery voltage V exceeds the reference voltage V1, driving continues intermittently as a result of the control circuit 106 restarting the driving of the piezoelectric actuator A. The intermittent driving of the piezoelectric actuator A is thus controlled according to the decrease and recovery conditions of the battery voltage V, whereby driving is continued until the battery voltage V falls below the minimum operating voltage V2, and is restarted if the battery voltage V exceeds the reference voltage V1. Therefore, the drive time can be extended as long as possible, the time wherein driving is stopped can be reduced to the necessary minimum, and the overall time of intermittent driving can be reduced.

(2) Furthermore, controlling the intermittent driving of the piezoelectric actuator A on the basis of the battery voltage V makes it possible to perform driving in accordance with the decrease in the battery voltage V and to markedly reduce the size of the battery 200 and the electronic timepiece 1, even when a small power source prone to voltage reduction is used. Furthermore, it is also possible to make it easier to use a particular power source with large internal resistance that is prone to voltage reduction.

(3) Also, since intermittent driving is executed according to the decrease and recovery conditions of the battery voltage V, the piezoelectric actuator A can be driven in a stable manner without the voltage falling below the minimum level necessary for driving, and the voltage at the time driving is restarted can be ensured by restarting driving after the voltage exceeds the reference voltage V1.

(4) Also, setting the reference voltage V1 with the reference voltage generating circuit 103 on the basis of the battery voltage V0 maintained by the sample holding circuit 102 before drive control is started makes it possible for the reference voltage V1 to be set on the basis of a reduced battery voltage V0 when the initial value of the battery voltage V has decreased after continuous use. Therefore, the drive time can be further reduced in comparison with the prior art, in which the driving time and drive stopping time in intermittent driving must be set by also taking into account the fact that the initial value of the power source voltage will decrease.

(5) Furthermore, since the battery voltage V0 is again held at a point in time when the elapsed time T reaches the set time T0 after the basic timepiece drive signal for the electronic timepiece 1 is received and the reference voltage V1 is reset, the reference voltage V1 can be set according to the recovery conditions even when the recovery conditions of the battery voltage V are nonuniform, and the time during which driving is stopped can be reduced to shorten the overall driving time even when the battery voltage V gradually becomes difficult to recover during intermittent driving.

(6) Also, since the drive control apparatus 100 operates using the drive control start signal from the switch 201 based on the basic timepiece drive signal as a trigger, the date display mechanism 10 can be driven to an arbitrary time such as in the vicinity of 12:00 am, and the date display of the electronic timepiece 1 can be changed.

(7) Also, since the driving of the piezoelectric actuator A is stopped by the control circuit 106 on the basis of the rotation determination signal from the rotation determining circuit 107, the driving of the piezoelectric actuator A can be stopped to complete the intermittent driving, and the piezoelectric actuator A can be driven solely by the desired amount, even if the driving time and drive stopping time of intermittent driving are not set in advance as in conventional practice. Furthermore, there is no need to provide a circuit or the like for separately controlling drive completion, and the drive control apparatus 100 can be simplified.

(8) Also, using the piezoelectric actuator A as the drive device makes it possible to achieve highly efficient driving with a small and thin configuration, and to further reduce the size of the electronic timepiece 1.

(9) Also, since the capacitor 202 is connected in series with the battery 200, an electric charge can be accumulated in the capacitor 202 when the drive control apparatus 100 is not operating, the reduction in the battery voltage V due to the driving of the piezoelectric actuator A can be suppressed, the size of the battery 200 can be further reduced, and the driving can be further stabilized.

2. Second Embodiment

Next, the second embodiment of the present invention will be described.

In the second embodiment, the electronic timepiece 1 and the drive control apparatus 100 have the same configuration as in the above-described first embodiment, but the drive control method is different.

Specifically, in steps S7 and S8 of the first embodiment, driving is controlled so that the driving of the piezoelectric actuator A is stopped and the battery voltage V0 is once again held by the sample holding circuit 102 when the elapsed time T exceeds the set time T0 after the basic timepiece drive signal from the divider circuit 5 is received.

In the second embodiment, the steps S7 and S8 of the first embodiment are omitted. Specifically, driving is executed without holding the battery voltage V0 one more time while the piezoelectric actuator A is driven.

[2-1. Drive Control Method of the Piezoelectric Actuator A]

Figure 5:
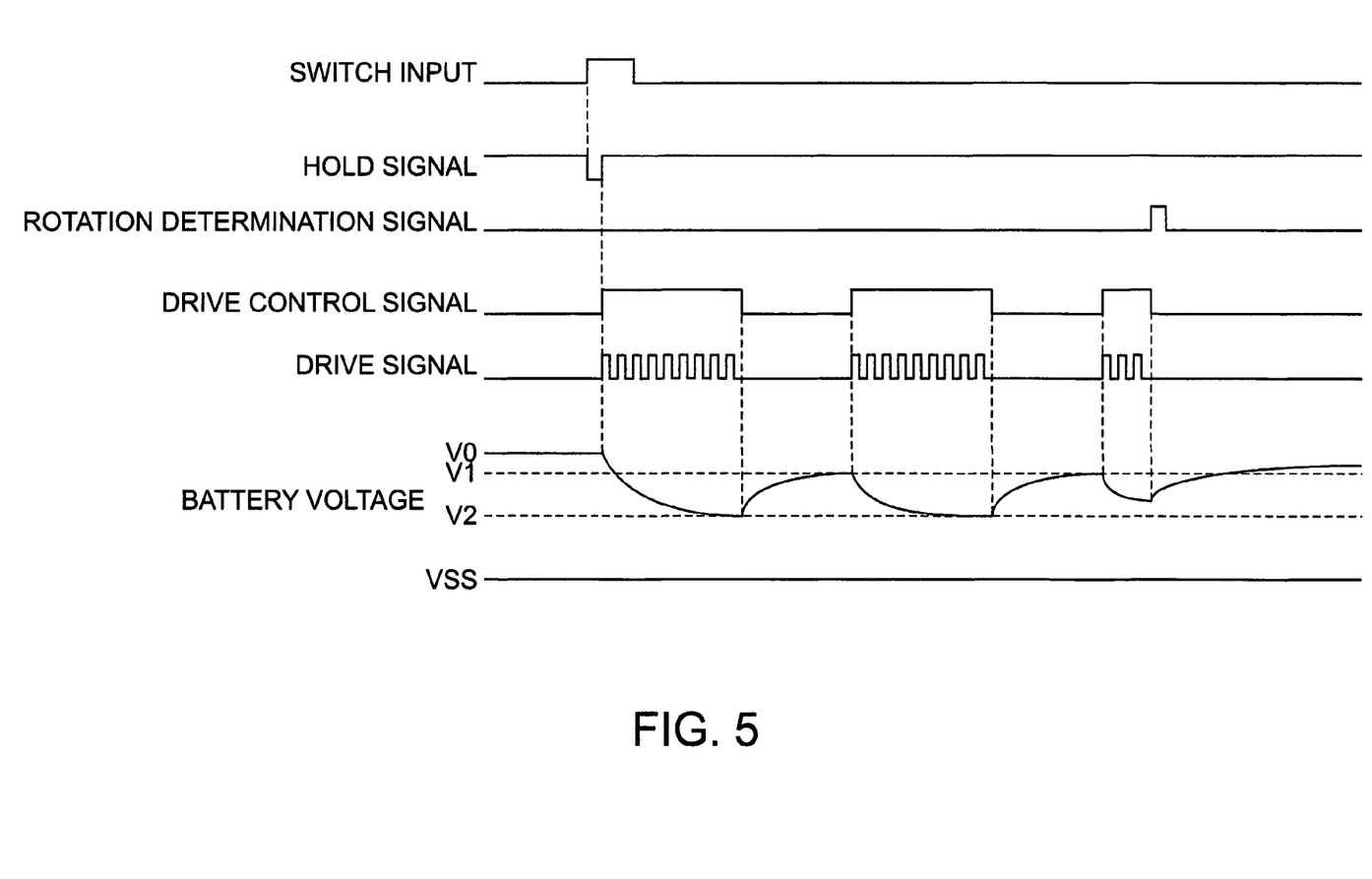
FIG. 5 is a timing chart showing the operation of the drive control apparatus according to the second embodiment of the present invention.

As shown in the timing chart in FIG. 5, after receiving the drive control start signal from the switch 201, the control circuit 106 sends a hold signal to the sample holding circuit 102 only once when drive control is started. The battery voltage V0 is then held by the sample holding circuit 102, and the reference voltage V1 is set by the reference voltage generating circuit 103 on the basis of the battery voltage V0 thus held. This reference voltage V1 is not changed while the piezoelectric actuator A is driven, but the reference voltage V1 set at the start of drive control is maintained until driving is completed. However, since this reference voltage V1 is set based on the battery voltage V0 held at the time the date display changes (the next day), a reference voltage V1 is set in accordance with the battery voltage V0 at the start of drive control every time.

[2-2. Effects of the Second Embodiment]

The second embodiment described above has the following effects in addition to the effects (1) through (4) and (6) through (9) previously described.

(10) Since the battery voltage V0 is not held one more time during the driving of the piezoelectric actuator A and there is no need to stop driving in preparation for the next holding cycle, the drive control by device of the control circuit 106 is simplified. Also, when a battery with few nonuniformities is used for the recovery conditions of the battery voltage V, and when the effects obtained by resetting the reference voltage V1 are less apparent, the time during which driving is stopped is reduced, and the overall driving time can therefore be reduced as well.

3. Third Embodiment

Next, the third embodiment of the present invention will be described with reference to FIG. 6.

The configuration and operation (control method) of the electronic timepiece 1 as the electronic device according to the present embodiment are substantially the same as in the first embodiment, and detailed descriptions thereof are omitted. The electronic timepiece 1 of the present embodiment has a characteristic relationship between the storage battery 200 as a power source, and the time display section and the date display mechanism 10. This characteristic is described in detail below.

Figure 6:
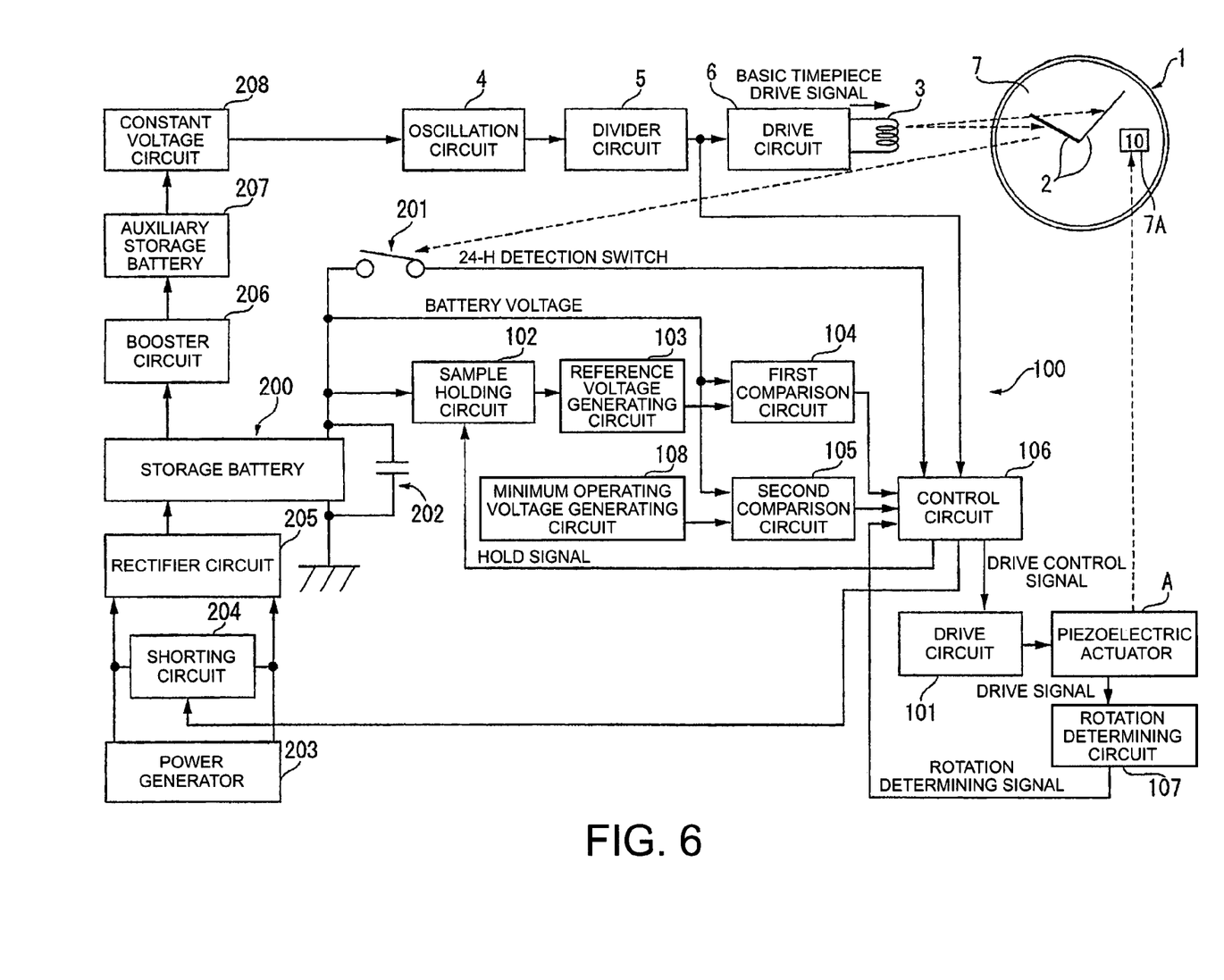
FIG. 6 is a block diagram showing the configuration of an electronic timepiece according to the third embodiment of the present invention.

FIG. 6 is a block diagram showing the electronic timepiece configuration of the electronic timepiece 1 as the electronic device according to the present embodiment.

In FIG. 6, the storage battery (high-capacity capacitor) 200, which is the power source of the electronic timepiece 1, is charged with electric power from a power generator 203, and the charged electric power is supplied to the drive control apparatus 100 and the stepping motor 3. A solar battery, a power generator with a rotor, a power generator driven by a mainspring, or the like can be used as the power generator 203, and the output from the power generator 203 is rectified by means of a rectifier circuit 205 composed of a boosting rectifier, a full-wave rectifier, a half-wave rectifier, a transistor rectifier, or the like, and is fed for charging to the storage battery 200. When a solar battery for generating direct-current power is used as the power generator 203, the rectifier circuit 205 is omitted and the solar battery may be connected to the storage battery 200 via a reverse current prevention circuit. Also, a shorting circuit 204 for shorting out the output of the power generator 203 to prevent excessive charging in the storage battery 200 is provided between the power generator 203 and the storage battery 200.

This shorting circuit 204 is designed to be turned on and off by the control circuit 106 of the drive control apparatus 100, and the control circuit 106 sends a control signal to the shorting circuit 204 to short-circuit the output of the power generator 203 and stop the charging of the storage battery 200 when the piezoelectric actuator A is being driven. Specifically, the charging termination control device is configured by the control circuit 106 and the shorting circuit 204, and the charging of the storage battery 200 is thus terminated while the piezoelectric actuator A is being driven, whereby fluctuations (increases) in the voltage of the storage battery 200 can be prevented, and the drive control of the piezoelectric actuator A can be stabilized. The device for preventing voltage fluctuations in the storage battery 200 while the piezoelectric actuator A is being driven is not limited to the charging termination control device, and may be a power generating termination control device wherein a control signal is sent from the control circuit 106 to the power generator 203 to stop power generation.

The storage battery 200 is connected to the oscillation circuit 4, the divider circuit 5, the drive circuit 6, and the stepping motor 3, which constitute the drive section in the time display section of the electronic timepiece 1, via a booster circuit 206, an auxiliary storage battery (capacitor) 207, and a constant voltage circuit 208. Thus, the power source voltage charged to the storage battery 200 is raised by the booster circuit 206 and is applied to the oscillation circuit 4 via the constant voltage circuit 208 after being temporarily charged to the auxiliary storage battery 207, whereby the oscillation frequency of the standard pulse outputted from the oscillation circuit 4 can be stabilized. Since the power source voltage applied to the oscillation circuit 4 is not easily subject to the effects of the drive load of the date display mechanism 10, a stable voltage can be supplied to the drive section of the time display section, and the movement of the pointers 2 can be stabilized. Specifically, the date display mechanism 10 of the electronic timepiece 1 driven by the piezoelectric actuator A as previously described is operated by turning on the switch 201 to which the 24-hour signal from the electronic timepiece 1 is inputted. Therefore, the load on the storage battery 200 increases while the date display mechanism 10 is operating. However, a stable voltage can be supplied to the drive section of the time display section by means of the auxiliary storage battery 207 and the constant voltage circuit 208.

Another possibility is a configuration wherein a booster circuit (or a step-down circuit) and an auxiliary storage battery are provided between the storage battery 200 and the drive control apparatus 100, and voltage is increased (or reduced) and the drive control apparatus 100 and piezoelectric actuator A are driven by the drive voltage temporarily charged to the auxiliary storage battery.

4. Fourth Embodiment

Next, the fourth embodiment of the present invention will be described with reference to FIGS. 7 and 8.

The present embodiment differs from the first through third embodiments in that the drive control apparatus 100 is applied to a portable electronic device, but the configuration and operation (control method) of the drive apparatus of the piezoelectric actuator are the same as in the previous embodiments. In the description of the fourth embodiment, structural elements that are the same as the previous embodiments are denoted by the same symbols, and descriptions are omitted or simplified.

In the present embodiment, the electronic device (portable device) is a noncontact IC card 300 having a payment function, and this IC card 300 is provided with a piezoelectric actuator A and a drive apparatus 310.

Figure 7:
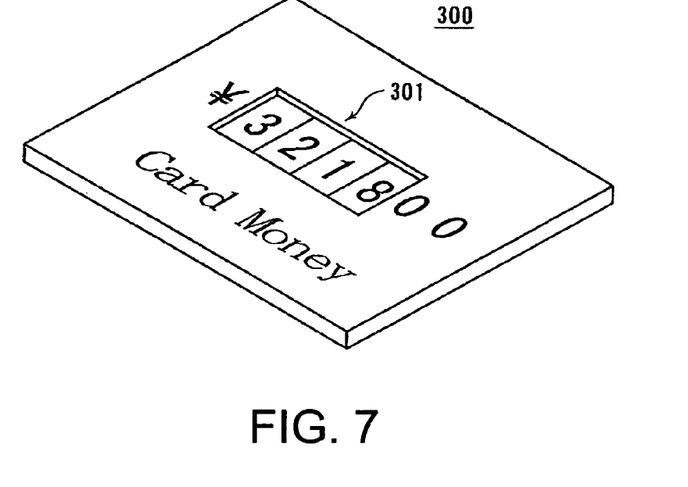
FIG. 7 is a perspective view showing an electronic timepiece according to the fourth embodiment of the present invention.
Figure 8:
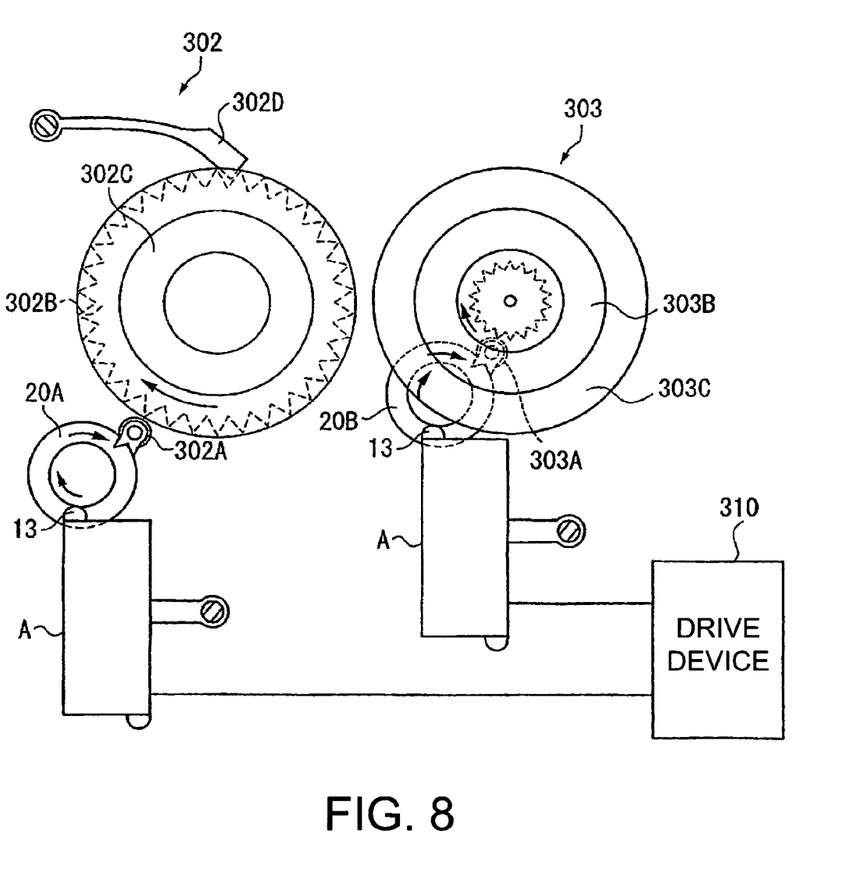
FIG. 8 is a detailed structural front view showing the digit display section in the electronic device.

FIG. 7 is an external perspective view of the noncontact IC card 300.

In FIG. 7, a remaining balance display counter 301 for displaying the remaining balance is disposed in the surface of the noncontact IC card 300.

The remaining balance display counter 301 displays the remaining balance in four digits, and comprises an upper digit display section 302 for displaying the upper two digits, and a lower digit display section 303 for displaying the lower two digits.

The upper digit display section 302 is linked to the piezo-electric actuator A via a rotor 20A, and is driven by the driving force of the rotor 20A. The main section of the upper digit display section 302 comprises a drive gear 302A that has urging teeth and that rotates once when the rotor 20A rotates 1/n times, a first upper digit display wheel 302B that rotates by one graduation when the drive gear 302A rotates once, a second upper digit display wheel 302C that turns by one graduation when the first upper digit display wheel 302B rotates once, and a fixing member 302D for fixing the first upper digit display wheel 302B in place when the first upper digit display wheel 302B is not rotating. The first upper digit display wheel 302B is also provided with a fixing member (not shown) for fixing the second upper digit display wheel 302C in place.

The drive gear 302A rotates once when the rotor 20A rotates 1/n times. The urging teeth of the drive gear 302A mesh with the urging gear section of the first upper digit display wheel 302B, and the first upper digit display wheel 302B is rotated by one graduation. Furthermore, when the first upper digit display wheel 302B rotates once, an urging pin provided to the first upper digit display wheel 302B rotates the urging gear, an urging gear of the second upper digit display wheel 302C is also rotated, and the second upper digit display wheel 302C is rotated by one graduation.

The lower digit display section 303 is linked to the piezo-electric actuator A via a rotor 20B, and is driven by the driving force of the rotor 20B. The main section of the lower digit display section 303 comprises a drive gear 303A that has urging teeth and that rotates once when the rotor 20B rotates 1/n times, a first lower digit display wheel 303B that turns by one graduation when the drive gear 303A rotates once, and a second lower digit display wheel 303C that turns by one graduation when the first lower digit display wheel 303B rotates once.

The first lower digit display wheel 303B has an urging gear that meshes with the urging teeth of the drive gear 303A and turns by one graduation when the drive gear 303A rotates once. The first lower digit display wheel 303B is provided with an urging pin, which rotates the urging gear and also turns the second lower digit display wheel 303C by one graduation every time the first lower digit display wheel 303B rotates once. In this case, the fixing members (not shown) of the first lower digit display wheel 303B and the second lower digit display wheel 303C mesh with both the urging gears and fix the first lower digit display wheel 303B and the second lower digit display wheel 303C in place when they are not rotating.

In the noncontact IC card 300 described above, the actuator A is set so as to be driven synchronously by the drive apparatus 310, and the drive apparatus 310 is driven as a result of a drive control signal corresponding to a settlement figure being inputted by an IC card chip (not shown). The specific structure of the drive apparatus 310 is the same as the drive control apparatus 100 in all the previous embodiments, so descriptions thereof are omitted.

Due to the configuration described above, even with a thin portable device such as a noncontact IC card, the remaining balance can be mechanically displayed, and while driving is not being executed, a display is possible without the need for a power source; therefore, data can be displayed with a low amount of product electricity, and the current display can be maintained even when the power source has expired.

5. Modifications of the Embodiments

The present invention is not limited to the previous embodiments, and includes modifications such as those shown below.

For example, in the previous embodiments, an electronic timepiece 1, or a wristwatch, and an IC card 300 were described, but the electronic timepiece is not limited to a wristwatch and may also be a standing clock or a wall clock. Also, the electronic device is not limited to an electronic timepiece or an IC card, and the present invention can be applied to various electronic devices, and is particularly suitable for electronic devices for portable use that require size reduction. Possible examples of the various electronic devices include phones, portable phones, personal computers, personal digital assistants (PDA), cameras, and other devices that include a timepiece function. The present invention can also be applied to electronic devices that do not include a timepiece function, such as cameras, digital cameras, video cameras, and portable phones with a camera function. When the present invention is applied to an electronic device with a camera function, the drive device of the present invention can be used to drive the focusing mechanism for the lens, the zoom mechanism, the aperture adjusting mechanism, or the like. Furthermore, the drive device of the present invention may be used as a drive mechanism for meter pointers in a measuring device, or a drive mechanism for mobile toys.

Also, in the previous embodiments, the piezoelectric actuator A was used as the drive device for driving the date display mechanism of the electronic timepiece 1, but the present invention is not limited thereto, and the time display hands (pointers) of the electronic timepiece 1 may also be driven by the drive device of the present invention. Thus, replacing the stepping motor 3 for driving the pointers with the piezoelectric actuator A makes it possible to further reduce the thickness of the electronic timepiece, and also makes it possible to ensure that the electronic timepiece will be highly antimagnetic because the piezoelectric actuator A is less susceptible to the effects of magnetism than the stepping motor.

Furthermore, in the present invention, all the devices within the drive control apparatus 100 are configured by various logical circuit elements and other such hardware, but the present invention is not limited thereto and may also be configured so that the devices are emulated by providing a computer with a CPU (central processing unit) and memory (storage apparatus) within the electronic device, and incorporating specific programs and data (data stored in the storage units) into the computer.

The programs and data may be stored in advance in RAM, ROM, or another type of memory incorporated into the electronic device. Also, for example, a specific control program and data may be installed in the electronic device via the Internet or another such communication means, or a CD-ROM, memory card, or other such recording medium. The devices may be implemented by operating the CPU or the like with a program stored in the memory. Specific programs and the like may be installed in a timepiece or portable device by directly inserting a memory card or a CD-ROM into the timepiece or portable device, or by externally connecting a device for reading these recording media to the timepiece or portable device. Furthermore, a LAN cable, a phone line, or the like may be connected to the timepiece or portable device to load and install the programs by communication, or the programs may be supplied and installed wirelessly.

Also, in the previous embodiments, the reference voltage V1 generated by the reference voltage generating circuit 103 was set to a specific ratio in relation to the held battery voltage V0 (for example, 90%), but the present invention is not limited thereto, and the reference voltage V1 may be set by any of the following setting methods a) through f).

Specifically, various setting methods can be employed, such as the following:

a) A method of measuring the time it takes the battery voltage V to fall below the minimum operating voltage V2 after drive control of the piezoelectric actuator A is started, and setting the reference voltage on the basis of this time;

b) A method of measuring the time it takes the battery voltage V to exceed the reference voltage V1 after conditions are created in which the battery voltage V falls below the minimum operating voltage V2 and the driving of the piezoelectric actuator A is stopped, and setting the reference voltage on the basis of this time;

c) A method of calculating the ratio of the times in a) and b), and setting the reference voltage on the basis of this ratio;

d) A method of incorporating a temperature sensor into the electronic device, and setting the reference voltage on the basis of the temperature measured by this temperature sensor;

e) A method of setting the reference voltage according to an arbitrary coefficient that fluctuates according to the battery voltage V0 held at the time the drive control of the piezoelectric actuator A is started; and f) A method of setting the reference voltage according to the internal resistance of the battery 200.

If the reference voltage V1 is set using such a setting method, highly precise driving according to the recovery conditions of the power source voltage is started, and therefore the drive time can be further reduced.

Also, in the present embodiment, the piezoelectric actuator A was used as the drive device, but a common motor or other device that is not a piezoelectric actuator may also be used. However, a piezoelectric actuator has a small and thin configuration and allows for highly efficient driving as previously described, and the apparatus and the power source can therefore be reduced in size and thickness.

Also, in the previous embodiments, a rotation determining circuit 107 for determining the rotational frequency of the date turning intermediate wheel 30 was used as the drive amount determination device, but the drive amount determination device is not limited to one that detects the drive amount of the object to be driven by the piezoelectric actuator A. For example, a piezoelectric element for determining vibration may be affixed to the surface of the vibrating body 12 of the piezoelectric actuator A, and the drive amount of the piezoelectric actuator A may be directly calculated based on a signal outputted from this piezoelectric element for determining vibration.

In addition, the preferred configurations, methods, and other aspects for carrying out the present invention are disclosed in the above descriptions, but the present invention is not limited thereto. Specifically, the present invention is particularly illustrated and described primarily with reference to specific embodiments, but those skilled in the art can make various modifications to the shapes, materials, quantities, and other specific details of the embodiments described above without deviating from the scope of the technical ideas and objects of the present invention.

The terms "front," "back," "up," "down," "vertical," "horizontal," "slanted," and other direction-related terms used above indicate the directions in the diagrams used. Therefore, the direction-related terminology used to describe the present invention should be interpreted in relative terms as applied to the diagrams used.

"Substantially," "essentially," "about," and other terms that are used above and represent an approximation indicate a reasonable amount of deviation that does not bring about a considerable change as a result. Terms that represent these approximations should be interpreted so as to include a minimum error of about ±5%, as long as there is no considerable change due to the deviation.

The disclosures in Japanese Patent Application No. 2004-051182 are incorporated herein in their entirety by reference.

The embodiments described above are only some of the possible embodiments of the present invention, but it is apparent to those skilled in the art that it is possible to add modifications to the above-described embodiments by using the above-described disclosure without exceeding the range of the present invention as defined in the claims. The above-described embodiments furthermore do not limit the range of the present invention, which is defined by the accompanying claims or equivalents thereof, and are designed solely to provide a description of the present invention.

What is claimed is:

1. A drive control apparatus for controlling drive of drive means driven by application of drive voltage from a power source, comprising:

reference voltage setting means for setting reference voltage on the basis of the drive voltage;

first comparison means for comparing the reference voltage and the drive voltage;

second comparison means for comparing a preset minimum drive voltage and the drive voltage; and drive control means for making the reference voltage setting means change the reference voltage on the basis of a first voltage, which is the drive voltage when drive control of the drive means has not been started, and controlling thereafter the drive so that the drive means is not driven when the drive voltage falls below the minimum drive voltage, and the drive means is driven when the drive voltage exceeds the reference voltage.

2. The drive control apparatus according to claim 1, wherein the drive control apparatus further includes drive amount determination means for determining drive amount of the drive means and sending determined drive amount to the control means, and the control means completes the drive of the drive means when the drive amount has reached a specific drive amount.

3. The drive control apparatus according to claim 1, wherein the control means stops and starts controlling the drive at a specific timing determined in advance; and the reference voltage setting means resets the reference voltage on the basis of the drive voltage while the control means stops controlling the drive.

4. The drive control apparatus according to claim 1, wherein the drive means is a piezoelectric actuator having a vibrating body vibrated by application of a drive signal with a specific frequency.

5. An electronic device, comprising:

a power source;

drive means driven by application of drive voltage from the power source; and a drive control apparatus configured to control drive of the drive means, the drive control apparatus having reference voltage setting means for setting reference voltage on the basis of the drive voltage, first comparison means for comparing the reference voltage and the drive voltage, second comparison means for comparing the drive voltage and a preset minimum drive voltage, and drive control means for making the reference voltage setting means change the reference voltage on the basis of a first voltage, which is the drive voltage when drive control of the drive means has not been started, and controlling thereafter the drive so that the drive means is not driven when the drive voltage falls below the minimum drive voltage, and the drive means is driven when the drive voltage exceeds the reference voltage.

6. The electronic device according to claim 5, wherein the drive means is a piezoelectric actuator having a vibrating vibrated by the application of a drive signal with a specific frequency.

7. The electronic device according to claim 5, wherein the power source is a primary or secondary battery.

8. The electronic device according to claim 5, wherein a capacitor is connected in series with the power source.

9. The electronic device according to claim 5, further comprising
a date display mechanism driven by the drive means.

10. The electronic device according to claim 9, further comprising
a timing device configured to generate a basic timepiece drive signal, and
drive voltage maintaining means for maintaining the drive voltage when the basic timepiece drive signal is inputted.

11. The electronic device according to claim 9, wherein
the control means stops and starts controlling the drive with a specific preset timing; and
the reference voltage setting means resets the reference voltage on the basis of the drive voltage the control means stops controlling the drive.

12. A drive control method of an electronic device for controlling drive of an electronic device having a power source and drive means driven by application of drive voltage from the power source, the drive method comprising:
setting reference voltage on the basis of the drive voltage;
comparing the reference voltage and the drive voltage;
comparing the drive voltage and a preset minimum drive voltage;
making the reference voltage be changed on the basis of a first voltage, which is the drive voltage when the drive control of the drive means has not been started; and
controlling the drive after the making the reference voltage be set so that the drive means is not driven when the drive voltage falls below the minimum drive voltage, and the drive means is driven when the drive voltage exceeds the reference voltage.

13. A computer readable medium storing a drive control program for controlling an electronic device having a power source and drive means driven by application of drive voltage from the power source, the drive control program comprising:
code for setting reference voltage on the basis of the drive voltage;
code for comparing the reference voltage and the drive voltage;
code for comparing the drive voltage and a preset minimum drive voltage; and
code for changing the reference voltage on the basis of a first voltage, which is the drive voltage when the drive control has not been started, and controlling the drive thereafter so that the drive means is not driven when the drive voltage falls below the minimum drive voltage, and the drive means is driven when the drive voltage exceeds the reference voltage.

14. A drive control apparatus, comprising:
a power source;
drive means for driving by application of power source voltage from the power source;
reference voltage setting means for setting a reference voltage on the basis of the power source voltage;
first comparison means for comparing reference voltage and the power source voltage;
second comparison means for comparing a preset minimum drive voltage and the power source voltage; and
control means for starting drive of the drive means, stopping the drive of the drive means when the power source voltage falls below minimum drive voltage at the second comparison means, and completing the drive when drive amount of a driven body exceeds preset drive amount, while repeatedly restarting the drive of the drive means when the power source voltage exceeds the reference voltage at the first comparison means,
the control means making the reference voltage setting means set the reference voltage before the drive of the drive means, controlling thereafter the drive by alternating starting and stopping the drive of the drive means, resetting and changing the reference voltage on the basis of the power source voltage when the drive is stopped, and continuing the controlling the drive on the basis of the reference voltage after reset.

* * * * *